US008516806B2

(12) United States Patent
Sujan et al.

(10) Patent No.: US 8,516,806 B2
(45) Date of Patent: Aug. 27, 2013

(54) CONTROL OF AFTERTREATMENT REGENERATION IN A HYBRID POWERED VEHICLE

(75) Inventors: Vivek Anand Sujan, Columbus, IN (US); J. Stephen Wills, Columbus, IN (US); Morgan MacKenzie Andreae, Columbus, IN (US); Martin T. Books, Columbus, IN (US)

(73) Assignee: Cummins, Inc., Columbus, IN (US)

( * ) Notice: Subject to any disclaimer, the term of this patent is extended or adjusted under 35 U.S.C. 154(b) by 314 days.

(21) Appl. No.: 12/907,608

(22) Filed: Oct. 19, 2010

(65) Prior Publication Data

US 2012/0090294 A1    Apr. 19, 2012

(51) Int. Cl.
*F01N 3/00* (2006.01)

(52) U.S. Cl.
USPC ............ 60/297; 60/274; 60/280; 60/295; 60/301; 180/65.1; 180/65.275; 180/65.285; 180/29; 180/309

(58) Field of Classification Search
USPC ............ 60/274, 280, 284, 286, 295, 297, 60/301; 180/65.1, 65.265, 65.275, 65.28, 180/65.285, 29, 309
See application file for complete search history.

(56) References Cited

U.S. PATENT DOCUMENTS

| 3,732,751 | A | 5/1973 | Berman et al. |
| 5,842,534 | A | 12/1998 | Frank |
| 6,568,173 | B1 | 5/2003 | Kolmanovsky et al. |
| 6,912,848 | B2 | 7/2005 | Bedapudi |
| 7,100,362 | B2 | 9/2006 | McGee et al. |
| 7,213,397 | B2 * | 5/2007 | Hu et al. ............... 60/295 |
| 7,404,289 | B2 * | 7/2008 | Miwa et al. ............ 60/285 |
| 7,487,030 | B2 | 2/2009 | Heap et al. |
| 7,559,388 | B2 * | 7/2009 | Severinsky et al. ...... 180/65.28 |
| 7,621,120 | B2 | 11/2009 | Matheaus et al. |
| 7,748,214 | B2 * | 7/2010 | Ishii et al. .............. 60/295 |
| 7,818,959 | B2 * | 10/2010 | Hu et al. ............... 60/274 |
| 2004/0074682 | A1 | 4/2004 | Fussey et al. |
| 2005/0126162 | A1 | 6/2005 | Otake et al. |
| 2008/0300743 | A1 | 12/2008 | Conlon et al. |
| 2009/0118080 | A1 | 5/2009 | Heap et al. |
| 2009/0312889 | A1 | 12/2009 | Krupadanam et al. |
| 2010/0063659 | A1 | 3/2010 | Ogiso |

OTHER PUBLICATIONS

International Search Report and Written Opinion, PCT/US11/56907, ISA/US, Cummins Inc., Mar. 7, 2012.

* cited by examiner

*Primary Examiner* — Binh Q Tran
(74) *Attorney, Agent, or Firm* — Krieg DeVault LLP

(57) ABSTRACT

A method for controlling aftertreatment regeneration for a system having a hybrid powertrain is described. The method includes determining that an engine aftertreatment regeneration is indicated when a regeneration request index exceeds a first threshold. The method includes determining an acceptable battery usage amount based on a current battery state of charge (SOC) and a minimum battery SOC. The method further includes determining a battery usage amount for an engine aftertreatment regeneration operation. The method includes initiating an engine aftertreatment regeneration when the battery usage amount is less than or equal to the acceptable battery usage amount.

24 Claims, 5 Drawing Sheets

300 ─▶

| ENGINE AFTER-TREATMENT REGENERATION OPERATION MODE (234) | BATTERY USAGE AMOUNT (222) | FIRST THRESHOLD (218) | E.A.R. INDICATED? (220) | BATTERY REGEN MARGIN (240) |
|---|---|---|---|---|
| ENGINE MODIFICATION ONLY | 50 | 85 | N | 100 |
| ELECTRICAL MODIFICATION, LOW CAPABILITY | 100 | 55 | Y | 50 |
| ELECTRICAL WITH ACCESSORY LOAD | 125 | 50 | Y | 25 |
| ELECTRICAL MODIFICATION, MEDIUM CAPABILITY | 175 | 65 | N | -25 |
| ELECTRICAL MODIFICATION, HIGH CAPABILITY | 225 | 75 | N | -75 |

*FIG. 3*

CONTROL OF AFTERTREATMENT REGENERATION IN A HYBRID POWERED VEHICLE

BACKGROUND

The technical field generally relates to hybrid powered vehicles having an aftertreatment system for treating the exhaust of an internal combustion side of the hybrid power system. Hybrid powered vehicles include at least two different power sources for the motive force of the vehicle, typically a combustion source and an electrical source. The combustion source produces emissions as a byproduct of normal operation, and with modern emissions regulations combustion power sources often require an aftertreatment system to remove or convert some of the emissions before the exhaust is released to the environment.

Many types of aftertreatment systems require periodic regeneration events to ensure proper operation. Regeneration of the aftertreatment system requires some type of off-nominal operation, or at least requires monitoring that normal operation has achieved the required regeneration conditions. A vehicle having a hybrid power system may be more capable in some circumstances to achieve a regeneration event than a vehicle having only a single power source. However, the interacting power systems in the hybrid power systems experience varying consequences in response to off-nominal operation. Unintended negative consequences can be experienced in a hybrid power system if the consequences to each of the power systems are not considered during a regeneration operation. Accordingly, successfully achieving the required regeneration schedule for an aftertreatment system in a hybrid powered vehicle can be more complex than for a vehicle having a single power source. Therefore, further technological developments are desirable in this area.

SUMMARY

One embodiment is a unique method to determine that a battery SOC supports an aftertreatment regeneration event before initiating the aftertreatment event. Other embodiments include unique methods, systems, and apparatus to control aftertreatment events in a hybrid power train system. Further embodiments, forms, objects, features, advantages, aspects, and benefits shall become apparent from the following description and drawings.

BRIEF DESCRIPTION OF THE DRAWINGS

FIG. 3 is an exemplary number of aftertreatment regeneration operation modes corresponding to a number of battery usage amounts.

DESCRIPTION OF THE ILLUSTRATIVE EMBODIMENTS

Figure 1:
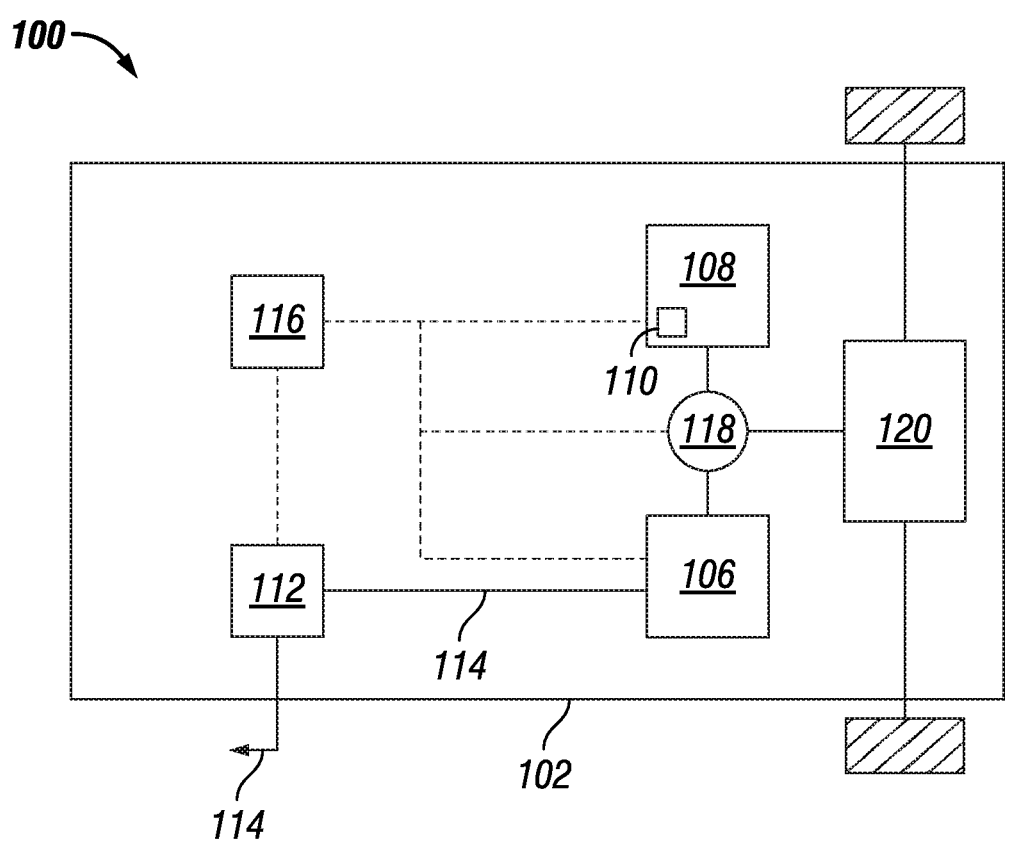
FIG. 1 is a schematic block diagram of a system for controlling aftertreatment regeneration in a hybrid powered vehicle.

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

Referencing FIG. 1, a system 100 includes a vehicle 102 having a hybrid powertrain system. The hybrid powertrain system includes a first motive power contributor 106 (engine) that is an internal combustion engine and a second motive power contributor 108 that includes a battery 110. The motive power contributors 106, 108 are connected in the example of FIG. 1 through a power splitter 118 that accepts and receives power from either or both motive power contributors 106, 108, and further provides power to a driveline 120 that moves the vehicle 102. The second motive power contributor 108 includes a motor, a generator, and/or a motor/generator. The hybrid powertrain system is not limited to the example in FIG. 1, and may be, without limitation, a series, parallel, series-parallel, or any configuration that includes an engine 106 and a second motive power contributor 108, and that further includes allowing transfer of power between the motive power contributors 106, 108 or that allows the second motive power contributor 108 to contribute to one or more functions of the engine 106 during at least some operating conditions.

The system 100 further includes an engine aftertreatment system 112 that receives an exhaust stream 114 from the engine 106, where the engine aftertreatment system 112 requires episodic regeneration events. The engine aftertreatment system 112 may include any aftertreatment component understood in the art, including at least a particulate filter, a catalyzed particulate filter, a $NO_x$ adsorber, an oxidation catalyst, and/or a selective catalytic reduction component. The episodic regeneration events may be events to regenerate the aftertreament component, and/or the regeneration events may be events that occur in the ordinary operations of the aftertreatment system 112. Exemplary events to regenerate the aftertreatment component include raising the temperature of the aftertreatment component to remove sulfur or other contaminants from the aftertreatment component. Exemplary events that occur in the ordinary operations of the aftertreatment system 112 include, without limitation, soot removal from a filter and conversion of adsorbed $NO_x$. The episodic regeneration events include operating conditions that, at least part of the time, are not ordinarily provided by the engine 106, including elevated temperatures or altered concentrations of certain exhaust 114 constituents such as oxygen.

When an episodic regeneration event occurs, during at least certain operating conditions of the system 100, the second motive power contributor 108 experiences elevated output. The elevated output occurs due to any factor understood in the art, including at least the engine 106 torque contribution for motive power being reduced during the episodic regeneration event, and/or the second motive power contributor 108 providing power to the aftertreatment system 112 to support the regeneration event. Examples of the second motive power contributor 108 providing power to the aftertreatment system 112 to support the regeneration event include at least powering an electric heater, and providing counter-torque or resistance for the engine 106 to work against and thereby elevate exhaust temperatures.

The system 100 further includes a controller 116 having modules structured to functionally execute certain operations to control aftertreatment regeneration in the hybrid powered vehicle 102. In certain embodiments, the controller forms a portion of a processing subsystem including one or more computing devices having memory, processing, and communication hardware. The controller may be a single device or a distributed device, and the functions of the controller may be performed by hardware or software.

The controller 116 is in communication with various sensors and actuators in the system 100 to provide information to perform the control functions. In certain embodiments, the controller 116 is in communication with the engine 106 and/or aftertreatment system 112 to determine: whether the aftertreatment system 112 has a present need for a regeneration event, an amount of benefit that would be achieved by a present regeneration event of the aftertreatment system 112, whether a request (e.g. provided by a controller, not shown, associated with the engine 106 and/or aftertreatment system 112) for a regeneration event is presently active, and whether a regeneration event is presently occurring on the aftertreatment system 112 and whether the present regeneration event is passive (e.g. occurring due to normally present operating conditions) or active (i.e. being performed in response to a request).

The description herein including modules emphasizes the structural independence of the aspects of the controller 116, and illustrates one grouping of operations and responsibilities of the controller 116. Other groupings that execute similar overall operations are understood within the scope of the present application. Modules may be implemented in hardware and/or software on computer readable medium, and modules may be distributed across various hardware or software components.

The exemplary controller 116 includes a regeneration request module, a battery consumption module, a battery monitoring module, and a regeneration control module. The regeneration request module determines whether an engine aftertreatment regeneration is indicated in response to a regeneration request index being greater than a first threshold. The battery consumption module calculates a battery usage amount for an engine aftertreatment operation in response to the indicated engine aftertreatment regeneration. The battery monitoring module determines an acceptable battery usage amount in response to a current battery state of charge (SOC) and a minimum battery SOC. The regeneration control module provides an engine aftertreatment regeneration command in response to the battery usage amount and the acceptable battery usage amount. Certain exemplary embodiments of the system 100 further include the controller 116 having a regeneration opportunity module, a regeneration priority module, and/or a regeneration mode selection module. More specific descriptions of certain embodiments of controller operations are included in the section referencing FIG. 2.

Figure 2:
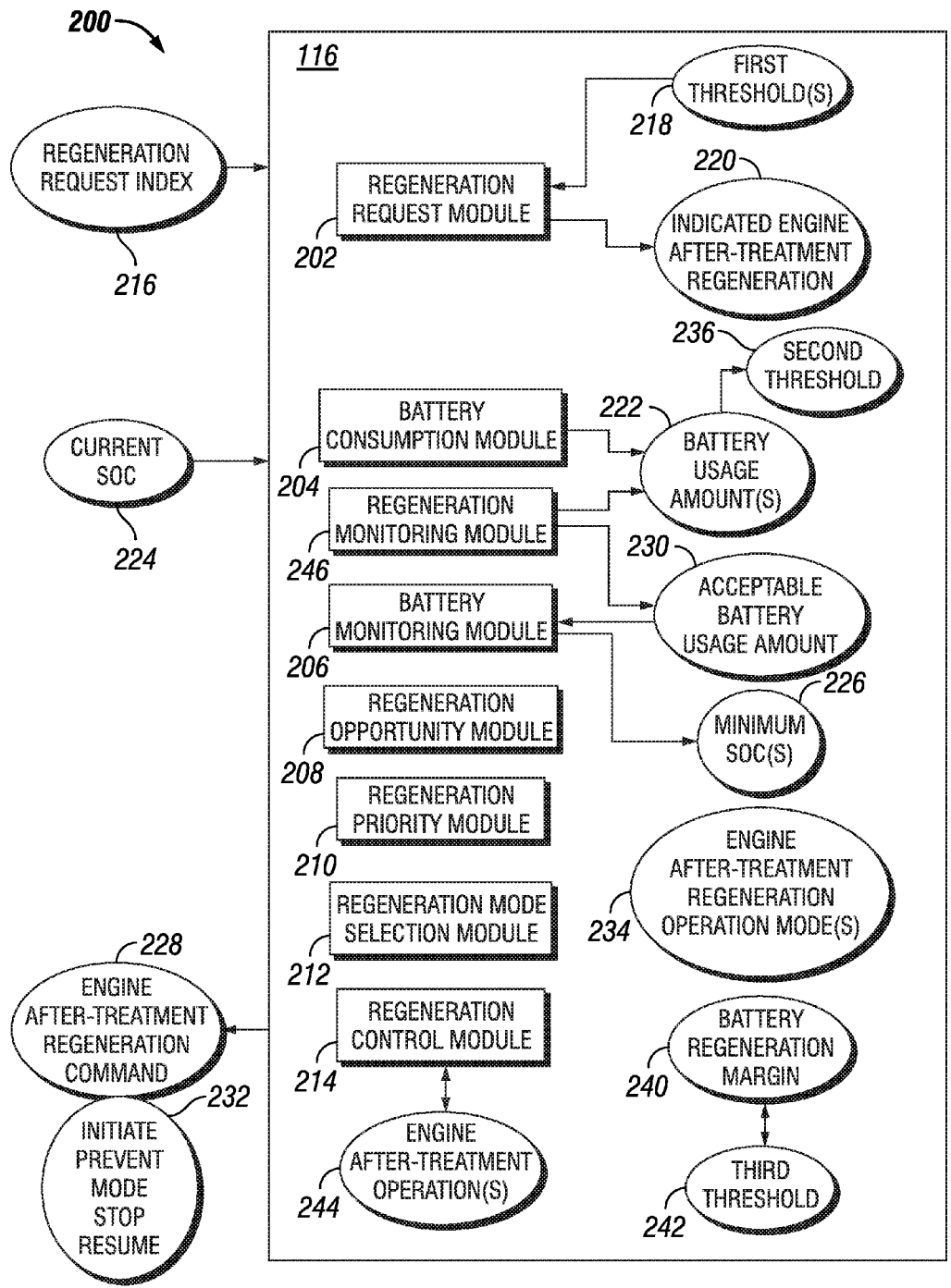
FIG. 2 is a schematic diagram of an exemplary controller that controls aftertreatment regeneration in a hybrid powered vehicle.

FIG. 2 is a schematic illustration of a processing subsystem 200 including a controller 116. The controller 116 includes a regeneration request module 202 that interprets a regeneration request index 216 and determines an indicated engine aftertreatment regeneration 220 in response to the regeneration request index 216 exceeding a first threshold 218. Interpreting a data value includes, without limitation, reading the value from a memory location, receiving the value over a datalink, receiving the value as a physical value (e.g. a voltage reading from a sensor), and/or calculating the value from one or more other parameters.

The regeneration request index 216 is any value and data type understood in the art that indicates, or provides information that can be used to indicate, whether an aftertreatment component 112 regeneration event is needed or desired. An exemplary regeneration request index 216 is a fundamental value relating to the need to regenerate—non-limiting examples include an amount of soot present on a soot filter, a pressure drop of the soot filter indicating an amount of soot on the filter (correlated with, for example, a flow rate through the soot filter, and/or a present uniformity of soot distribution on the filter), an amount of adsorbed NOx presently on a NOx adsorber, and/or a current catalyst efficiency amount remaining (e.g. indicating an amount of sulfur bound on the aftertreatment component). Another exemplary regeneration request index 216 includes a value that indirectly relates to the need to regenerate—non-limiting examples include accumulation variables since a previous regeneration event such as total time, operating time, distance traveled, a usage accumulator, and/or accumulated time below certain operating thresholds such as specified exhaust temperatures. Yet another exemplary regeneration request index 216 is a binary parameter indicating that a regeneration event for the aftertreatment system is requested or not requested.

The first threshold 218 is a value that provides for an indicated engine after-treatment regeneration 220 at a specified value of the regeneration request index 216. Where the regeneration request index 216 is a binary parameter, the first threshold 218 is a value such that one value of the regeneration request index 216 provides an indicated engine after-treatment regeneration 220 and the other value of the regeneration request index 216 does not provide the indicated engine after-treatment regeneration 220. Non-limiting examples of a first threshold include a pressure drop amount across a soot filter (e.g. absolute or normalized to a specified exhaust 114 flow rate), a stored soot amount, a stored $NO_x$ amount, and a catalyst efficiency amount. In certain embodiments, the first threshold 218 is stored at a memory location accessible to the controller 116, or the first threshold 218 may be provided as a communication to the controller 116 during operations of the processing subsystem 200.

The controller 116 further includes a battery consumption module 204 that calculates a battery usage amount 222 for an engine aftertreatment operation 244 in response to the indicated engine aftertreatment regeneration 220. The battery consumption module 204 determines the battery usage amount 222 according to the excess output of the second motive power provider during the engine aftertreatment operations 244. The excess output is the amount of energy that will be pulled from the battery during the regeneration event, above the amount of energy that will be replaced to the battery during the regeneration event. The battery usage amount 222 is determined according to the length of the regeneration event, the average power output of the system during the regeneration event, and the contribution of the second motive power provider to meet the average power output of the system. The battery usage amount 222 may be stored as a pre-determined parameter, for example based upon empirical tests for battery drain amounts according to a current state of the aftertreatment component, or the battery usage amount 222 may be calculated in real-time on the controller 116.

Additionally or alternatively, the controller 116 may determine the battery usage amount 222 over time in response to several regeneration events, according to the state of the aftertreatment component at the beginning of each of the regeneration events. Further, the current duty cycle experienced by the hybrid powertrain system may be factored into the determination of the battery usage amount, for example a duty cycle that produces an average low exhaust temperature may be determined to require a greater battery usage amount 222 than a duty cycle that produces an average high exhausts temperature. The determination of an appropriate battery usage amount 222 for a specific system 100 based upon the state of the aftertreatment component and the current duty cycle of the system is a mechanical step for one of skill in the art having the benefit of the disclosures herein. A small number data points based upon varying duty cycles (e.g. high, medium, and low) and further based upon a varying aftertreatment component conditions (e.g. high, medium, and low soot loading) provide sufficient information to determine a battery usage amount 222 in a typical exemplary system.

The controller 116 further includes a battery monitoring module 206 that determines an acceptable battery usage amount 230 in response to a current battery state of charge (current SOC) 224 and a minimum battery state of charge (minimum SOC) 226. Determination of the current SOC 224 is well known in the art, and no further description is provided herein. The minimum SOC 226 is dependent upon the specific battery technology present in the system, and the designed battery life in the system. Certain battery types allow for deeper discharge, and certain battery types require maintaining a narrower range of SOC values to preserve the battery life. The value of the minimum SOC 226 may vary dependent upon the current priority of a regeneration event. For example, a battery may have a minimum SOC 226 of 70% of a full charge for normal conditions, and the battery monitoring module 206 may allow the minimum SOC 226 to fall to 60% when a failure to regenerate the aftertreatment system increases the likelihood of an emissions or performance impact on the system.

The controller 116 further includes a regeneration control module 214 that provides an engine aftertreatment regeneration command 228 in response to the battery usage amount 222 and the acceptable battery usage amount 230. For example, where the battery usage amount 222 is lower than the acceptable battery usage amount 230, the regeneration control module 214 provides an engine aftertreatment regeneration command 228 that indicates to the system that the aftertreatment component regeneration is to proceed. In a further embodiment, the regeneration control module 214 may provide specific engine aftertreatment operations 244 in the engine aftertreatment regeneration command 228 that are followed directly by system actuators or that are provided to an engine controller (not shown) to be acted on accordingly. For example, the conditions assumed by the battery consumption module 204 to determine the battery usage amount 222 may be provided as a portion of the engine aftertreatment regeneration command 228. In a further example, the battery consumption module 204 selects an engine aftertreatment operation 244 including a specific temperature for the aftertreatment system, the battery monitoring module 206 determines the battery usage amount 222 to be lower than the acceptable battery usage amount 230, and the regeneration control module 214 provides the specific temperature for the aftertreatment system as a portion of the engine aftertreatment regeneration command 228.

In certain embodiments, the regeneration control module 214 further provides the engine aftertreatment regeneration command 228 to prevent the engine aftertreatment regeneration operation 244 in response to the battery usage amount 222 exceeding the acceptable battery usage amount 230. The engine aftertreatment regeneration command 228 to prevent the engine aftertreatment regeneration operation 244 may be the absence of a positive command to cause an aftertreatment regeneration operation 244, or a negative command that actively prevents the system 100 from performing the aftertreatment regeneration operation 244.

Another exemplary embodiment includes the controller 116 having a regeneration mode selection module 212 that determines a number of battery usage amounts 222, with each of the battery usage amounts 222 corresponding to one of a number of engine aftertreatment regeneration operation modes 234. Referencing FIG. 3, a number of engine aftertreatment regeneration operation modes 234 are illustrated. The exemplary modes 234 are non-limiting and are listed as a qualitative description of each mode.

For example, the mode 234 "Engine modification only" references an aftertreatment regeneration operation 244 performed with only modifications to the internal combustion engine 106 operation to assist in completing the regeneration operation for the aftertreatment component 112. Exemplary engine operating modifications are known in the art, but non-limiting examples include changing the fuel injection scheme (e.g. post-injector or retarding injection timing), changing the current EGR recipe, and/or adjusting an intake or exhaust throttle of the engine 106. The exemplary mode 234 "Electrical modification, low capability" includes low intrusion modifications to the operation of the second motive power contributor 108, for example operating in a generating mode to increase the torque output of the engine 106, electronically powering a bypass valve to reduce flow through the aftertreatment component 112 (thereby providing lower mass flow to heat, assisting in achieving the regeneration temperature), or any other electrical modification by the second motive power contributor 108 that is lower than the "medium capability" mode 234.

The "Electrical with accessory load" refers to an operation to provide some assistance for the regeneration from the second motive power contributor 108, combined with turning on certain accessory loads that are not currently required but that are allowed. Non-limiting examples include activating an engine fan (requiring the engine 106 to increase torque output), deactivating the engine fan (increasing engine coolant temperature which may be utilized to assist in regeneration), and/or operating a climate control feature of the vehicle 102 in a higher energy usage mode (e.g. increasing compressor output and reducing air flow, increasing air flow and reducing compressor output, or tightening a hysteresis tolerance causing activation of the climate control system where it may otherwise be inactive). The "Electrical modification, medium capability" and "Electrical modification, high capability" include behaviors that are increasingly capable of assisting regeneration of the aftertreatment component 112, while potentially being more intrusive and causing higher battery usage than the behaviors under a "low capability" mode 234. Non-limiting examples of medium and high capability electrical modifications include applying direct motoring counter-torque against the engine 106 at the power splitter 118 (or elsewhere in the power train), and powering an electrical resistance heater for direct heating of the aftertreatment component 112.

The described list of engine aftertreatment regeneration operation modes 234 is exemplary and non-limiting. Certain embodiments may include one or more of the listed modes 234, and/or modes 234 that are not listed herein. Further, the modes 234 may be named differently, and may utilize different referencing systems such as index numbers. Certain behaviors that are described may be combined or separated into various modes 234 as will be understood by one of skill in the art having the benefit of the disclosures herein.

The battery consumption module 204 calculates a battery usage amount 222 for each of the engine aftertreatment regeneration operation modes 234. The battery usage amount 222 is determined according to the behaviors exhibited by the mode 234, and the present conditions of the system 100 including the recent duty cycle history of the power train system (e.g. high speeds and loads, low speeds and loads, transient or steady state operation, etc.) and the predicted duration of the aftertreatment regeneration, which may be based on the capability of the corresponding mode 234 (e.g. high temperature capability likely indicates a shorter regeneration event) and the present condition of the aftertreatment component (e.g. 80 grams of soot regeneration will take longer than 45 grams of soot regeneration). The battery usage amounts 222 may result from increased output of the second motive power contributor 108 and/or from a reduced electrical generating contribution from the engine 106 during an aftertreatment regeneration event.

One of skill in the art, having the benefit of the disclosures herein, can readily determine battery usage amounts 222 corresponding to each of the modes 234 based upon the conditions present in the system 100 at the time of the indicated engine aftertreatment regeneration 220. Each of the engine aftertreatment regeneration operation modes 234 includes a distinct level of power contribution from the second motive power contributor 108, and therefore a distinct battery usage amount 222. The distinct battery usage amount 222 indicates that each battery usage amount 222 is determined from distinct parameters of electrical usage and engine electrical generation combination during the aftertreatment regeneration event, although the value of the battery usage amount 222 for two different modes 234 may be the same or similar depending upon the system 100 conditions. The battery usage amounts 222 may be determined by the battery consumption module 204 during run-time based on the condition of the system 100, and/or may be stored in a lookup table accessible to the battery consumption module 204, as will be understood in the art.

In the example of FIG. 3, the battery usage amounts 222 are shown in terms of arbitrary units that are generally consistent with the relative impacts of the described behaviors. However, the values in FIG. 3 for the battery usage amounts 222 are illustrative only. The exemplary controller 116 further includes the regeneration mode selection module 212 selecting an engine aftertreatment regeneration operation mode 234 having a battery usage amount 222 that is lower than an acceptable battery usage amount 230. In the example of FIG. 3, where the acceptable battery usage amount 230 is 150 units, the regeneration mode selection module 212 selects any one of the engine aftertreatment regeneration operation modes 234 including engine modification only, electrical modification with low capability, and/or electrical with accessory load.

The regeneration control module 214 further provides the engine aftertreatment regeneration command 228 to initiate the selected engine aftertreatment regeneration operation mode 234. A further embodiment includes the regeneration mode selection module 212 further selecting the engine aftertreatment regeneration mode 234 having a greatest difference between the corresponding battery usage amount 222 and the acceptable battery usage amount 230. The difference between the corresponding battery usage amount 222 and the acceptable battery usage amount 230 may be calculated and determined as a battery regeneration margin 240. In certain embodiments, the regeneration mode selection module 212 selects an engine aftertreatment regeneration operation mode 234 having a battery regeneration margin 240 indicating the aftertreatment operation can be completed before the battery is unacceptably drained, and/or selects an engine aftertreatment regeneration operation mode 234 having the greatest battery regeneration margin 240. In certain embodiments, a particular regeneration mode 234 may have a lower battery regeneration margin 240, but nevertheless the regeneration mode selection module 212 selects the regeneration mode 234 because it includes a more favorable outcome for fuel economy, engine wear, emissions output, or for other considerations understood in the art.

In certain embodiments, the regeneration control module 214 providing the engine aftertreatment regeneration command 228 initiates the selected engine aftertreatment regeneration operation mode 234, continues an ongoing engine aftertreatment regeneration operation mode 234, and/or discontinues an unselected engine aftertreatment regeneration operation mode 234. The status commands 232 to initiate, prevent, select a mode, stop, and resume the mode may be a subset of the engine aftertreatment regeneration commands 228 as illustrated in FIG. 2.

An exemplary controller 116 further includes a regeneration priority module 210 that adjusts the minimum SOC 226 in response to a value of the regeneration request index 216. In one example, when the regeneration request index 216 indicates that an aftertreatment regeneration event is becoming more urgent, the regeneration priority module 210 prioritizes achieving an aftertreatment regeneration over maintaining the battery SOC 224, and provides a lower minimum SOC 226 to provide a greater chance of triggering and achieving an aftertreatment regeneration. In a further example, the regeneration priority module 210 tracks a regeneration request index 216 that is representative of a soot loading amount on a particulate filter, and determines the minimum SOC 226 as a function of the soot loading amount, allowing a reduced minimum SOC 226 as the soot loading increases.

The exemplary controller 116 further includes a regeneration opportunity module 208 that lowers the first threshold 218 in response to the battery usage amount 222 being below a second threshold 236. Certain operating conditions provide for nominal outlet conditions of the engine 106 that require little or no active support to achieve aftertreatment regeneration conditions. For example, a high load steady state output condition may provide temperatures needed to oxidize soot on a particulate filter with little or no input from the second motive power contributor 108. Accordingly, the regeneration opportunity module 208 lowers the first threshold 218, allowing the system 100 to achieve a low cost regeneration event in certain circumstances. In certain embodiments, the first threshold 218 is changed independently for various engine aftertreatment regeneration operation modes 234, allowing for the system 100 to achieve the low cost regeneration event with the mode 234 that is favored by the present operating conditions as determined according to the battery usage amount 222 for each mode 234. In certain embodiments, the regeneration opportunity module 208 adjusts the first threshold 218 as a function of the battery usage amount 222, and/or adjusts the first threshold 218 in response to the battery regeneration margin 240 being greater than a third threshold 242. An exemplary regeneration opportunity module 208 provides a number of first thresholds 218, each of the number of first thresholds 218 determined as a function of the battery usage amounts 222. The battery usage amounts 222 each correspond to one of a number of engine aftertreatment regeneration operation modes 234.

The regeneration request module 202 further determines whether an indicated engine aftertreatment regeneration 220 is present for each of the engine aftertreatment regeneration modes. Referencing FIG. 3, a first threshold 218 for each of the engine after-treatment regeneration operation modes 234 is shown, and the indicated engine aftertreatment regenerations 220 shown are consistent with a current regeneration request index 216 that is greater than 50 and less than 65. In the illustration of FIG. 3, the regeneration request module 202 will provide the indicated engine aftertreatment regeneration 220 for the two modes 234 "electrical modification, low capability" and "electrical with accessory load", the regeneration mode selection module 212 will select one of the two modes, and the regeneration control module 214 will provide an engine aftertreatment regeneration command 228 to perform the engine aftertreatment operations 244 consistent with the selected mode 234.

In certain embodiments, the controller 116 includes a regeneration monitoring module 246 that updates the acceptable battery usage amount 230 and/or the battery usage amount 222 during the engine aftertreatment regeneration operation 244. As the aftertreatment regeneration progresses, updated information on conditions of the aftertreatment component 112, ambient conditions, and vehicle 102 duty cycle, as well as comparison of predicted regeneration progress versus achieved progress, can cause changes to and improvements in the battery usage amount 222 calculations and inn the acceptable battery usage amount 230. Accordingly, the regeneration monitoring module 246 provides updates to the battery usage amount(s) 222 and/or the acceptable battery usage amount 230 during the regeneration operations. In certain embodiments, the regeneration control module 214 further stops, or pauses, the engine aftertreatment regeneration in response to the battery usage amount going below the acceptable battery usage amount.

In certain embodiments, the regeneration control module 214 suspends the engine aftertreatment regeneration operation in response to the vehicle 102 stopping. In a further embodiment, the regeneration monitoring module 246 updates the acceptable battery usage amount 230 and/or the battery usage amount(s) 222, and the regeneration control module 214 resumes the engine aftertreatment operation in response to the vehicle 102 resuming movement if one or more of the updated battery usage amount(s) 222 is not greater than the updated acceptable battery usage amount 230.

The schematic flow diagrams and related descriptions which follow provide an illustrative embodiment of performing procedures for controlling aftertreatment regeneration in a hybrid powered vehicle. Operations illustrated are understood to be exemplary only, and operations may be combined or divided, and added or removed, as well as re-ordered in whole or part, unless stated explicitly to the contrary herein. Certain operations illustrated may be implemented by a computer executing a computer program product on a computer readable medium, where the computer program product comprises instructions causing the computer to execute one or more of the operations, or to issue commands to other devices to execute one or more of the operations.

Figure 4:
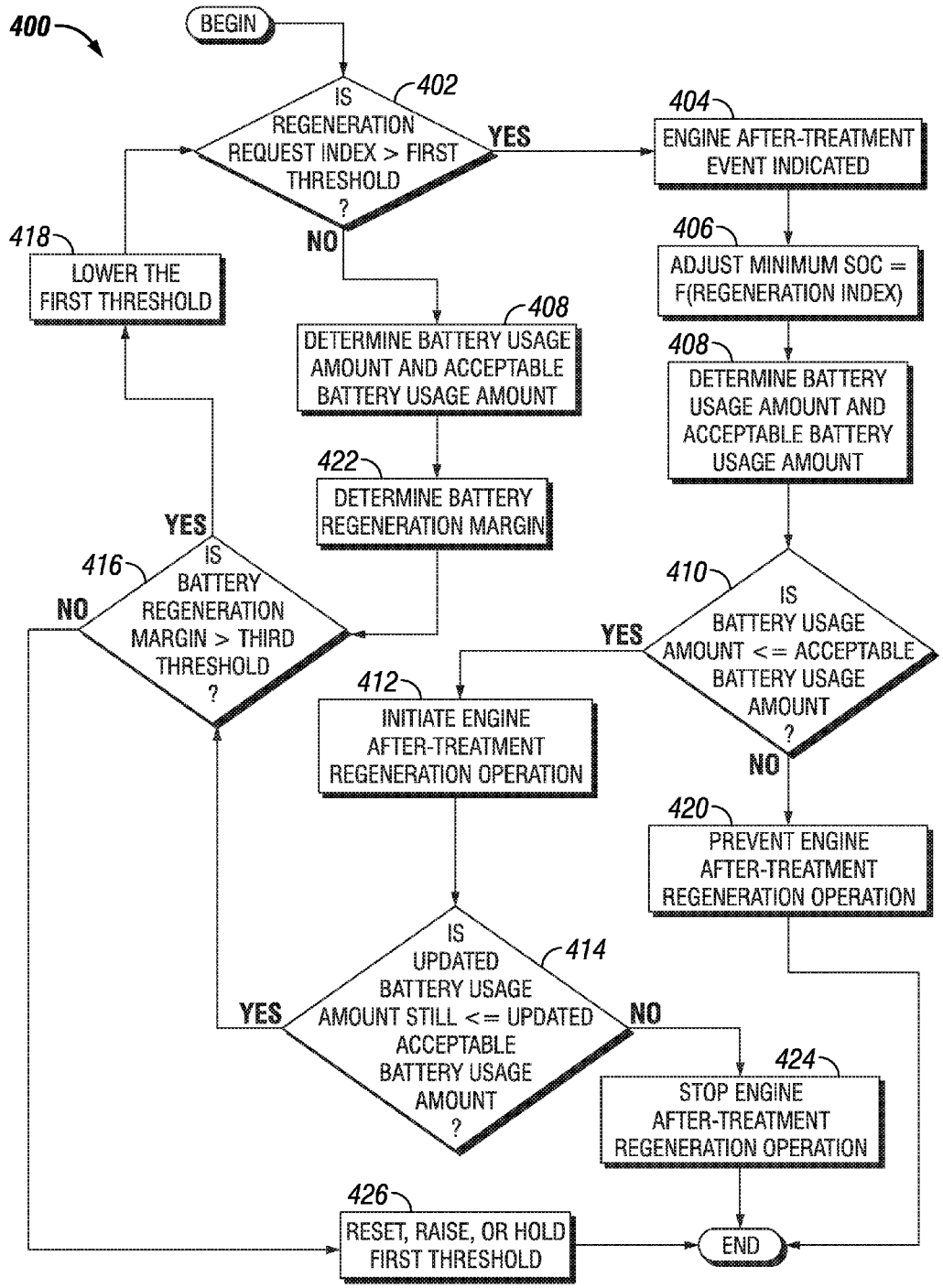
FIG. 4 is a schematic flow diagram of a procedure for controlling aftertreatment regeneration in a hybrid powered vehicle.

Referencing FIG. 4, an exemplary procedure 400 includes an operation 402 to determine whether a regeneration request index exceeds a first threshold. In response to the operation 402 indicating YES, the procedure includes an operation 404 to provide an indicated engine aftertreatment event, and an operation 406 to adjust a minimum SOC as a function of the regeneration request index. The procedure 400 further includes an operation to determine a battery usage amount and an acceptable battery usage amount. The procedure 400 includes an operation 410 to determine whether the battery usage amount is less than or equal to the acceptable battery usage amount. In response to the operation 410 indicating YES, the procedure includes an operation 412 to initiate an engine aftertreatment regeneration operation, and an operation 414 to determine whether an updated battery usage amount remains less than or equal to an updated acceptable battery usage amount. In response to the operation 414 indicating YES, the procedure includes an operation 416 to determine whether a battery regeneration margin is greater than a third threshold value. In response to the operation 416 indicating YES, the procedure 400 includes an operation 418 to lower the first threshold. The operation 418 to lower the first threshold may be an incremental lowering operation, and/or an operation to lower the first threshold by an amount determined as a function of the magnitude of the battery regeneration margin. The exemplary procedure 400 continues with a return to the operation 402.

In response to the operation 402 indicating NO, the procedure includes the operation 408 to determine the battery usage amount and the acceptable battery usage amount, and an operation 422 to determine the battery regeneration margin, and the procedure includes the operation 416. In response to the operation 410 indicating NO, the procedure 400 includes an operation 420 to prevent an engine aftertreatment regeneration operation. In response to the operation 414 indicating NO, the procedure 400 includes an operation 424 to stop an engine aftertreatment regeneration operation. In response to the operation 416 indicating NO, the procedure 400 includes an operation 426 to reset, raise, or hold the first threshold. A reset of the first threshold includes an operation to return the first threshold to a default or initial calibration value. A raise of the first threshold includes an operation to increase a value of the first threshold, to at least partially return the first threshold toward an initial value, and/or to increase a value of the first threshold higher than an initial value. A hold of the first threshold includes an operation to leave the first threshold at a previously determined value.

Figure 5:
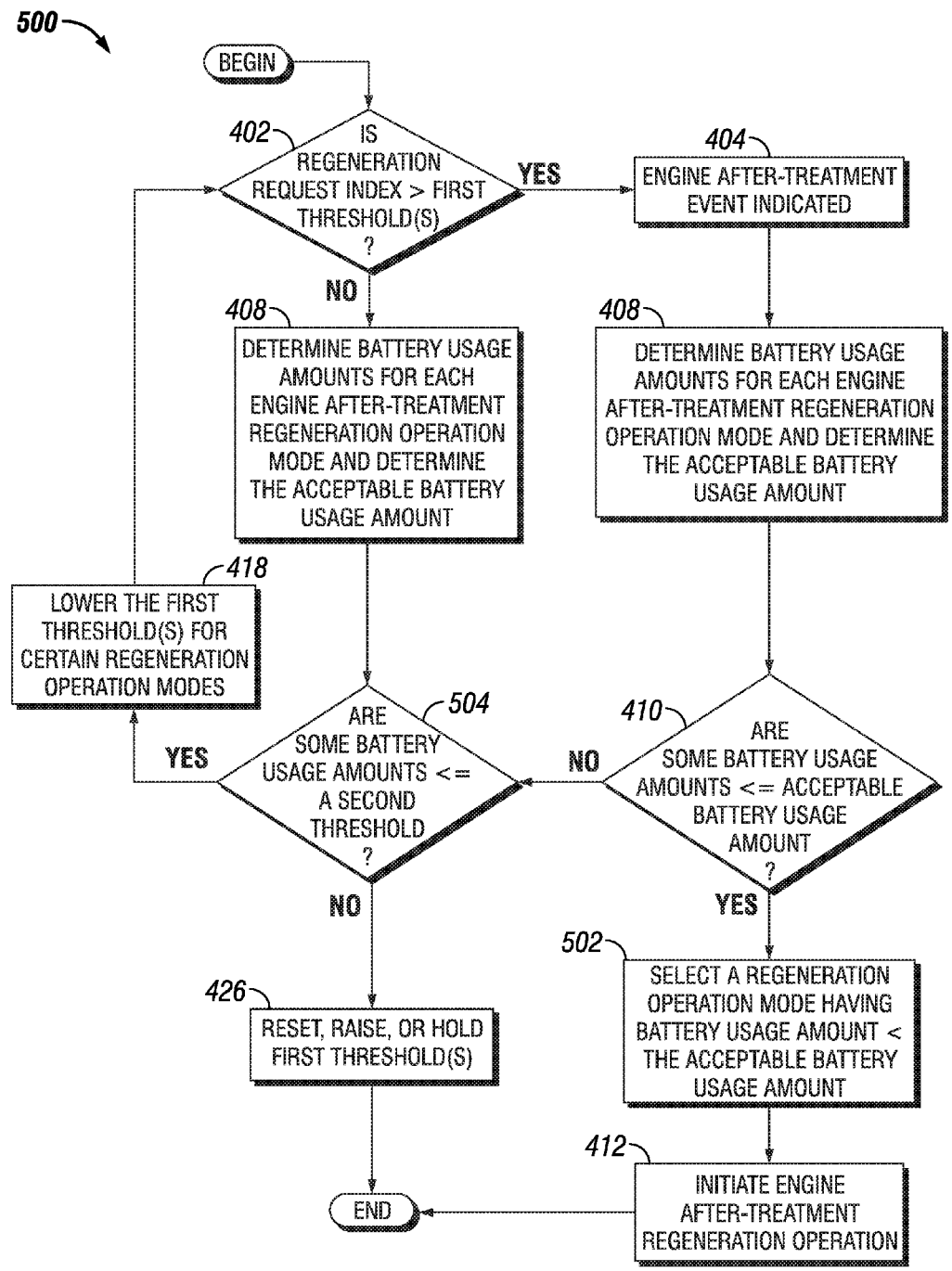
FIG. 5 is a schematic flow diagram of another procedure for controlling aftertreatment regeneration in a hybrid powered vehicle.

Referencing FIG. 5, a procedure 500 includes certain operations for controlling an aftertreatment regeneration in a system having a hybrid powertrain. The procedure 500 includes certain operations that are similar to operations performed in the procedure 400. The procedure 500 includes the operation 408 to determine battery usage amounts for one or more engine aftertreatment regeneration operation modes from a list of engine aftertreatment operation modes, and to determine the acceptable battery usage amount. The procedure 500 further includes an operation 410 to determine whether at least one battery usage amount is less than or equal to the acceptable battery usage amount. In response to the operation 410 indicating YES, the procedure 500 includes an operation 502 to select one of the engine aftertreatment regeneration operation modes having a battery usage amount that is less than the acceptable battery usage amount, and an operation 412 to initiate the engine aftertreatment regeneration operation corresponding to the selected engine aftertreatment regeneration operation mode.

In response to the operation 410 indicating NO, the procedure 500 includes an operation 504 to determine whether one or more of the battery usage amounts are less than or equal to a second threshold amount. In response to the operation 504 indicating YES, the procedure 500 includes an operation 418 to lower the first threshold for the one or more engine aftertreatment regeneration operating modes, and the procedure 500 returns to the operation 402 to determine whether the regeneration request index is greater than a first threshold for one or more of the engine aftertreatment regeneration operating modes. In response to the operation 504 indicating NO, the procedure 500 includes the operation 426 to reset, raise, or hold the first threshold(s) for the engine aftertreatment regeneration operating modes. In response to the operation 402 indicating NO, the procedure 500 passes to the operation 408 and then to the operation 504.

As is evident from the figures and text presented above, a variety of embodiments according to the present invention are contemplated.

An exemplary embodiment is a method including determining that an engine aftertreatment regeneration is indicated in response to a regeneration request index exceeding a first threshold. The method further includes calculating a battery usage amount for an engine aftertreatment regeneration operation in response to the determining the engine aftertreatment regeneration is indicated. The method further includes determining an acceptable battery usage amount in response to a current battery state of charge (current SOC) and a minimum battery state of charge (minimum SOC). The method further includes initiating the engine aftertreatment regeneration operation in response to the battery usage amount being not greater than the acceptable battery usage amount.

Further exemplary embodiments of the method are described following. The exemplary method further includes preventing the engine aftertreatment regeneration operation in response to the battery usage amount exceeding the acceptable battery usage amount. Another exemplary method includes determining a number of battery usage amounts, where each battery usage amount corresponds to one of a number of engine aftertreatment regeneration operation modes. The exemplary method further includes selecting one of the engine aftertreatment regeneration operation modes having a corresponding battery usage amount that is not greater than the acceptable battery usage amount, and where the initiating includes initiating the selected engine aftertreatment regeneration operation mode. In a further embodiment, the selecting includes selecting the engine aftertreatment regeneration operation mode having a greatest difference between the corresponding battery usage amount and the acceptable battery usage amount.

Another exemplary method includes adjusting the minimum SOC in response to a value of the regeneration request index. Another exemplary method includes lowering the first threshold in response to the battery usage amount being below a second threshold. Yet another exemplary method includes determining a battery regeneration margin that is a difference between the acceptable battery usage amount and the battery usage amount, and lowering the first threshold in response to the battery regeneration margin being greater than a third threshold. Another exemplary method includes updating the acceptable battery usage amount and/or the battery usage amount during the engine aftertreatment regeneration operation, and stopping the engine aftertreatment regeneration operation in response to the battery usage amount going below the acceptable battery usage amount.

Another exemplary embodiment is an apparatus including a regeneration request module that interprets a regeneration request index and determines that an engine aftertreatment regeneration is indicated in response to the regeneration request index exceeding a first threshold. The apparatus further includes a battery consumption module that calculates a battery usage amount for an engine aftertreatment operation in response to the indicated engine aftertreatment regeneration. The apparatus further includes a battery monitoring module that determines an acceptable battery usage amount in response to a current battery state of charge (current SOC) and a minimum battery state of charge (minimum SOC). The apparatus further includes a regeneration control module that provides an engine aftertreatment regeneration command in response to the battery usage amount and the acceptable battery usage amount.

Further embodiments of the exemplary apparatus are described following. An exemplary embodiment includes the regeneration control module further providing the engine aftertreatment regeneration command to initiate the engine aftertreatment regeneration operation in response to the battery usage amount being not greater than the acceptable battery usage amount. Another embodiment includes the regeneration control module further providing the engine aftertreatment regeneration command to prevent the engine aftertreatment regeneration operation in response to the battery usage amount exceeding the acceptable battery usage amount.

Another exemplary embodiment includes a regeneration mode selection module that determines a number of battery usage amounts, each of the battery usage amounts corresponding to one of a number of engine aftertreatment regeneration operation modes. The exemplary embodiment further includes selecting the engine aftertreatment regeneration operation mode(s) having a corresponding battery usage amount that is not greater than the acceptable battery usage amount. The regeneration control module further provides the engine aftertreatment regeneration command to initiate the selected engine aftertreatment regeneration operation mode. A further embodiment includes the regeneration mode selection module further selecting the engine aftertreatment regeneration mode having a greatest difference between the corresponding battery usage amount and the acceptable battery usage amount.

Another exemplary apparatus includes a regeneration priority module that adjusts the minimum SOC in response to a value of the regeneration request index. Another embodiment includes a regeneration opportunity module that lowers the first threshold in response to the battery usage amount being below a second threshold. Another embodiment includes the regeneration opportunity module adjusting the first threshold as a function of the battery usage amount.

Another exemplary apparatus includes a regeneration opportunity module that provides a number of first thresholds, each of the number of first thresholds determined as a function of one of the battery usage amounts. The battery usage amounts each correspond to one of a number of engine aftertreatment modes. The regeneration request module further determines whether the engine aftertreatment regeneration is indicated for each of the engine aftertreatment regeneration modes.

A further exemplary apparatus includes a regeneration monitoring module that updates the acceptable battery usage amount and/or the battery usage amount during the engine aftertreatment regeneration operation. The regeneration control module further stops the engine aftertreatment regeneration in response to the battery usage amount going below the acceptable battery usage amount.

Another exemplary embodiment is a system including a vehicle having a hybrid powertrain system. The hybrid power system includes a first motive power contributor that is an internal combustion engine and a second motive power contributor that includes a battery. The system further includes an engine aftertreatment system that receives an exhaust stream from the engine, where the engine aftertreatment system requires episodic regeneration events. The system further includes a controller having modules structured to functionally execute certain operations to control aftertreatment regeneration in a hybrid powered vehicle.

An exemplary controller includes a regeneration request module that interprets a regeneration request index and determines that an engine aftertreatment regeneration is indicated in response to the regeneration request index exceeding a first threshold. The exemplary controller further includes a battery consumption module that calculates a battery usage amount for an engine aftertreatment operation in response to the indicated engine aftertreatment regeneration. The controller further includes a battery monitoring module that determines an acceptable battery usage amount in response to a current battery state of charge (current SOC) and a minimum battery state of charge (minimum SOC). The controller further includes a regeneration control module that provides an engine aftertreatment regeneration command in response to the battery usage amount and the acceptable battery usage amount.

Certain further exemplary embodiments of the system are described following. An exemplary system further includes a regeneration mode selection module that determines a number of battery usage amounts, each battery usage amount corresponding to one of a number of engine aftertreatment regeneration operation modes. The regeneration mode selection module is further structured to select one of the engine aftertreatment regeneration operation modes having a corresponding battery usage amount that is not greater than the acceptable battery usage amount. Each of the engine aftertreatment regeneration operation modes includes a distinct level of power contribution from the second motive power contributor. The regeneration control module further provides the engine aftertreatment regeneration command to initiate the selected engine aftertreatment regeneration operation mode.

A further exemplary system includes a regeneration opportunity module that determines a battery regeneration margin that is a difference between the acceptable battery usage amount and the battery usage amount. The system includes the regeneration request module further lowering the first threshold in response to the battery regeneration margin being greater than a third threshold. Another exemplary embodiment includes a regeneration monitoring module that updates the acceptable battery usage amount and/or the battery usage amount during the engine aftertreatment regeneration operation. The regeneration control module further stops the engine aftertreatment regeneration in response to the battery usage amount going below the acceptable battery usage amount.

Another exemplary system includes the regeneration control module further suspending the engine aftertreatment regeneration operation in response to the vehicle stopping. In a further embodiment, a regeneration monitoring module updates the acceptable battery usage amount and the battery usage amount, and the regeneration control module resumes the engine aftertreatment operation in response to the vehicle resuming movement, and further in response to the updated battery usage amount being not greater than the updated acceptable battery usage amount.

While the invention has been illustrated and described in detail in the drawings and foregoing description, the same is to be considered as illustrative and not restrictive in character, it being understood that only certain exemplary embodiments have been shown and described and that all changes and modifications that come within the spirit of the inventions are desired to be protected. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method, comprising:
    determining that an engine aftertreatment regeneration is indicated in response to a regeneration request index exceeding a first threshold;
    calculating a battery usage amount for an engine aftertreatment regeneration operation in response to the determining the engine aftertreatment regeneration is indicated;
    determining an acceptable battery usage amount in response to a current battery state of charge (current SOC) and a minimum battery state of charge (minimum SOC);
    initiating the engine aftertreatment regeneration operation in response to the battery usage amount being not greater than the acceptable battery usage amount; and
    determining a plurality of battery usage amounts, each corresponding to one of a plurality of engine aftertreatment regeneration operation modes, and selecting one of the engine aftertreatment operating modes having a corresponding battery usage amount that is not greater than the acceptable battery usage amount, wherein each of the engine aftertreatment operation modes includes a distinct level of power contribution from a second motive power contributor, and providing the engine aftertreatment regeneration command to initiate the selected engine aftertreatment operation mode.

2. The method of claim 1, further comprising preventing the engine aftertreatment regeneration operation in response to the battery usage amount exceeding the acceptable battery usage amount.

3. The method of claim 1, further comprising:
    determining a plurality of battery usage amounts, each corresponding to one of a plurality of engine aftertreatment regeneration operation modes;
    selecting one of the engine aftertreatment regeneration operation modes having a corresponding battery usage amount that is not greater than the acceptable battery usage amount; and
    wherein the initiating comprises initiating the selected engine aftertreatment regeneration operation mode.

4. The method of claim 3, wherein the selecting comprises selecting the engine aftertreatment regeneration operation mode having a greatest difference between the corresponding battery usage amount and the acceptable battery usage amount.

5. The method of claim 1, further comprising adjusting the minimum SOC in response to a value of the regeneration request index.

6. The method of claim 1, further comprising lowering the first threshold in response to the battery usage amount being below a second threshold.

7. The method of claim 1, further comprising determining a battery regeneration margin comprising a difference between the acceptable battery usage amount and the battery usage amount, and lowering the first threshold in response to the battery regeneration margin being greater than a third threshold.

8. The method of claim 1, further comprising updating at least one of the acceptable battery usage amount and the battery usage amount during the engine aftertreatment regeneration operation, and stopping the engine aftertreatment regeneration operation in response to the battery usage amount going below the acceptable battery usage amount.

9. An apparatus, comprising:
    a regeneration request module structured to interpret a regeneration request index and to determine that an engine aftertreatment regeneration is indicated in response to the regeneration request index exceeding a first threshold;

a battery consumption module structured to calculate a battery usage amount for an engine aftertreatment operation in response to the indicated engine aftertreatment regeneration;

a battery monitoring module structured to determine an acceptable battery usage amount in response to a current battery state of charge (current SOC) and a minimum battery state of charge (minimum SOC);

a regeneration control module structured to provide an engine aftertreatment regeneration command in response to the battery usage amount and the acceptable battery usage amount;

a regeneration mode selection module structured to determining a plurality of battery usage amounts, each corresponding to one of a plurality of engine aftertreatment regeneration operation modes, and to select one of the engine aftertreatment regeneration operation modes having a corresponding battery usage amount that is not greater than the acceptable battery usage amount; and wherein the regeneration control module is further structured to provide the engine aftertreatment regeneration command to initiate the selected engine aftertreatment regeneration operation mode; and a regeneration opportunity module structured to provide a plurality of first thresholds, each of the plurality of first thresholds determined as a function of one of the battery usage amounts corresponding to one of the engine aftertreatment regeneration modes, and wherein the regeneration request module is further structured to determine whether the engine aftertreatment regeneration is indicated for each of the engine aftertreatment regeneration modes.

10. The apparatus of claim 9, wherein the regeneration control module is further structured provide the engine aftertreatment regeneration command to initiate the engine aftertreatment regeneration operation in response to the battery usage amount being not greater than the acceptable battery usage amount.

11. The apparatus of claim 9, wherein the regeneration control module is further structured to provide the engine aftertreatment regeneration command to prevent the engine aftertreatment regeneration operation in response to the battery usage amount exceeding the acceptable battery usage amount.

12. The apparatus of claim 9, wherein the regeneration mode selection module is further structured to select the engine aftertreatment regeneration mode having a greatest difference between the corresponding battery usage amount and the acceptable battery usage amount.

13. The apparatus of claim 9, further comprising a regeneration priority module structured to adjust the minimum SOC in response to a value of the regeneration request index.

14. The apparatus of claim 9, further comprising a regeneration opportunity module structured to lower the first threshold in response to the battery usage amount being below a second threshold.

15. The apparatus of claim 9, further comprising a regeneration opportunity module structured to adjust the first threshold as a function of the battery usage amount.

16. The apparatus of claim 9, further comprising a regeneration monitoring module structured to update at least one of the acceptable battery usage amount and the battery usage amount during the engine aftertreatment regeneration operation, and wherein the regeneration control module is further structured to stop the engine aftertreatment regeneration in response to the battery usage amount going below the acceptable battery usage amount.

17. A system, comprising:
a vehicle having a hybrid powertrain system including a first motive power contributor comprising an internal combustion engine and a second motive power contributor comprising a battery;

an engine aftertreatment system receiving an exhaust stream from the engine, the engine aftertreatment system requiring episodic regeneration events;

a controller, comprising:
a regeneration request module structured to interpret a regeneration request index and to determine that an engine aftertreatment regeneration is indicated in response to the regeneration request index exceeding a first threshold;

a battery consumption module structured to calculate a battery usage amount for an engine aftertreatment operation in response to the indicated engine aftertreatment regeneration;

a battery monitoring module structured to determine an acceptable battery usage amount in response to a current battery state of charge (current SOC) and a minimum battery state of charge (minimum SOC);

a regeneration control module structured to provide an engine aftertreatment regeneration command in response to the battery usage amount and the acceptable battery usage amount; and a regeneration mode selection module structured to determining a plurality of battery usage amounts, each corresponding to one of a plurality of engine aftertreatment regeneration operation modes and to select one of the engine aftertreatment regeneration operation modes having a corresponding battery usage amount that is not greater than the acceptable battery usage amount;

wherein each of the engine aftertreatment regeneration operation modes includes a distinct level of power contribution from the second motive power contributor; and wherein the regeneration control module further provides the engine aftertreatment regeneration command to initiate the selected engine aftertreatment regeneration operation mode.

18. The system of claim 17, further comprising a regeneration opportunity module structured to determine a battery regeneration margin comprising a difference between the acceptable battery usage amount and the battery usage amount, and wherein the regeneration request module is further structured to lower the first threshold in response to the battery regeneration margin being greater than a third threshold.

19. The system of claim 17, further comprising a regeneration monitoring module structured to update at least one of the acceptable battery usage amount and the battery usage amount during the engine aftertreatment regeneration operation, and wherein the regeneration control module is further structured to stop the engine aftertreatment regeneration in response to the battery usage amount going below the acceptable battery usage amount.

20. The system of claim 17, wherein the regeneration control module is further structured to suspend the engine aftertreatment regeneration operation in response to the vehicle stopping.

21. The system of claim 20, further comprising a regeneration monitoring module structured to update the acceptable battery usage amount and the battery usage amount, and wherein the regeneration control module is further structured to resume the engine aftertreatment operation in response to the vehicle resuming movement and the updated battery usage amount being not greater than the updated acceptable battery usage amount.

22. A method, comprising:
- determining a plurality of battery usage amounts, each corresponding to one of a plurality of engine aftertreatment regeneration operation modes;
- providing a plurality of first thresholds, each of the plurality of first thresholds determined as a function of one of the battery usage amounts corresponding to one of the engine aftertreatment regeneration modes;
- determining that an engine aftertreatment regeneration is indicated in response to a regeneration request index exceeding one of the first thresholds for each of the engine aftertreatment regeneration modes;
- calculating a battery usage amount for an engine aftertreatment regeneration operation in response to the determining the engine aftertreatment regeneration is indicated;
- determining an acceptable battery usage amount in response to a current battery state of charge (current SOC) and a minimum battery state of charge (minimum SOC);
- initiating the engine aftertreatment regeneration operation in response to the battery usage amount being not greater than the acceptable battery usage amount; and
- selecting one of the engine aftertreatment operating modes having a corresponding battery usage amount that is not greater than the acceptable battery usage amount, and providing the engine aftertreatment regeneration command to initiate the selected engine aftertreatment operation mode.

23. An apparatus, comprising:
- a regeneration request module structured to interpret a regeneration request index and to determine that an engine aftertreatment regeneration is indicated in response to the regeneration request index exceeding a first threshold;
- a battery consumption module structured to calculate a battery usage amount for an engine aftertreatment operation in response to the indicated engine aftertreatment regeneration;
- a battery monitoring module structured to determine an acceptable battery usage amount in response to a current battery state of charge (current SOC) and a minimum battery state of charge (minimum SOC);
- a regeneration control module structured to provide an engine aftertreatment regeneration command in response to the battery usage amount and the acceptable battery usage amount;
- a regeneration mode selection module structured to determining a plurality of battery usage amounts, each corresponding to one of a plurality of engine aftertreatment regeneration operation modes and to select one of the engine aftertreatment regeneration operation modes having a corresponding battery usage amount that is not greater than the acceptable battery usage amount;
- wherein each of the engine aftertreatment regeneration operation modes includes a distinct level of power contribution from a second motive power contributor; and
- wherein the regeneration control module further provides the engine aftertreatment regeneration command to initiate the selected engine aftertreatment regeneration operation mode.

24. The apparatus of claim 23, further comprising a regeneration opportunity module structured to lower the first threshold in response to the battery usage amount being below a second threshold.

* * * * *